(12) United States Patent
Thomas et al.

(10) Patent No.: US 10,934,868 B2
(45) Date of Patent: Mar. 2, 2021

(54) TURBINE VANE ASSEMBLY WITH VARIABLE POSITION SUPPORT

(71) Applicants: Rolls-Royce Corporation, Indianapolis, IN (US); Rolls-Royce North American Technologies Inc., Indianapolis, IN (US)

(72) Inventors: David J. Thomas, Brownsburg, IN (US); Ted J. Freeman, Danville, IN (US); Aaron D. Sippel, Zionsville, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 330 days.

(21) Appl. No.: 16/128,753

(22) Filed: Sep. 12, 2018

(65) Prior Publication Data
US 2020/0080434 A1 Mar. 12, 2020

(51) Int. Cl.
*F01D 9/04* (2006.01)
*F01D 5/18* (2006.01)

(52) U.S. Cl.
CPC ............. *F01D 9/042* (2013.01); *F01D 9/041* (2013.01); *F01D 5/189* (2013.01); *F05D 2240/126* (2013.01); *F05D 2260/20* (2013.01); *F05D 2300/50212* (2013.01); *F05D 2300/6033* (2013.01)

(58) Field of Classification Search
None
See application file for complete search history.

(56) References Cited

U.S. PATENT DOCUMENTS

| | | | | |
|---|---|---|---|---|
| 2,906,495 | A * | 9/1959 | Schum | F01D 5/188 416/92 |
| 2,946,681 | A * | 7/1960 | Probst | B22F 5/04 419/2 |
| 2,974,926 | A * | 3/1961 | Thompson, Jr. | F01D 5/187 416/92 |
| 4,247,259 | A * | 1/1981 | Saboe | B23P 15/04 29/889.71 |
| 4,311,433 | A * | 1/1982 | Bratton | F01D 5/184 416/97 A |
| 4,563,125 | A * | 1/1986 | Boudigues | F01D 5/18 415/115 |
| 4,563,128 | A * | 1/1986 | Rossmann | F01D 5/284 416/92 |
| 5,078,576 | A | 7/1992 | Hayton | |
| 6,000,906 | A * | 12/1999 | Draskovich | F01D 5/3084 415/189 |
| 6,464,456 | B2 | 10/2002 | Darolia et al. | |
| 6,709,230 | B2 | 3/2004 | Morrison et al. | |

(Continued)

*Primary Examiner* — Michael Lebentritt
(74) *Attorney, Agent, or Firm* — Barnes & Thornburg LLP

(57) ABSTRACT

A vane assembly for use in a gas turbine engine includes an airfoil, a strut, and a support member. The airfoil is configured to interact with gases flowing through a primary gas path of the engine. The strut is located in an interior region of the airfoil and configured to carry loads that act on the airfoil by the gases. The support member is configured to compensate for relative thermal expansion between the components of the vane assembly caused by heat generated during use of the engine to locate the airfoil radially in the primary gas path.

20 Claims, 6 Drawing Sheets

(56) References Cited

U.S. PATENT DOCUMENTS

| | | | |
|---|---|---|---|
| 7,247,002 B2 | 7/2007 | Albrecht et al. | |
| 7,326,030 B2 | 2/2008 | Albrecht et al. | |
| 7,329,087 B2 | 2/2008 | Cairo et al. | |
| 7,789,621 B2* | 9/2010 | Dierksmeier | F01D 5/147 |
| | | | 415/191 |
| 8,206,098 B2 | 6/2012 | Prill et al. | |
| 8,210,803 B2 | 7/2012 | Schaff et al. | |
| 9,617,857 B2* | 4/2017 | Shuck | B23P 15/04 |
| 9,970,317 B2 | 5/2018 | Freeman et al. | |
| 10,408,090 B2* | 9/2019 | Propheter-Hinckley | |
| | | | F01D 11/08 |
| 10,415,407 B2* | 9/2019 | Surace | F01D 5/187 |
| 10,428,663 B2* | 10/2019 | Propheter-Hinckley | |
| | | | F01D 25/246 |
| 10,458,262 B2* | 10/2019 | Propheter-Hinckley | |
| | | | F04D 29/542 |
| 2002/0127097 A1* | 9/2002 | Darolia | F01D 5/3084 |
| | | | 415/137 |
| 2008/0279679 A1* | 11/2008 | Morrison | F01D 9/042 |
| | | | 415/191 |
| 2009/0193657 A1* | 8/2009 | Wilson, Jr. | F01D 5/147 |
| | | | 29/889.721 |
| 2010/0068034 A1* | 3/2010 | Schiavo | F01D 5/189 |
| | | | 415/115 |
| 2013/0276457 A1* | 10/2013 | Houston | F01D 5/16 |
| | | | 60/805 |
| 2015/0354382 A1* | 12/2015 | Pakkala | F01D 9/065 |
| | | | 60/806 |
| 2017/0016341 A1* | 1/2017 | Stapleton | F01D 25/005 |
| 2017/0089221 A1* | 3/2017 | Paradis | F01D 9/04 |
| 2017/0130608 A1* | 5/2017 | Wiebe | F01D 9/065 |
| 2019/0284938 A1* | 9/2019 | Senile | F01D 9/041 |
| 2019/0390558 A1* | 12/2019 | Sippel | F01D 9/041 |

\* cited by examiner

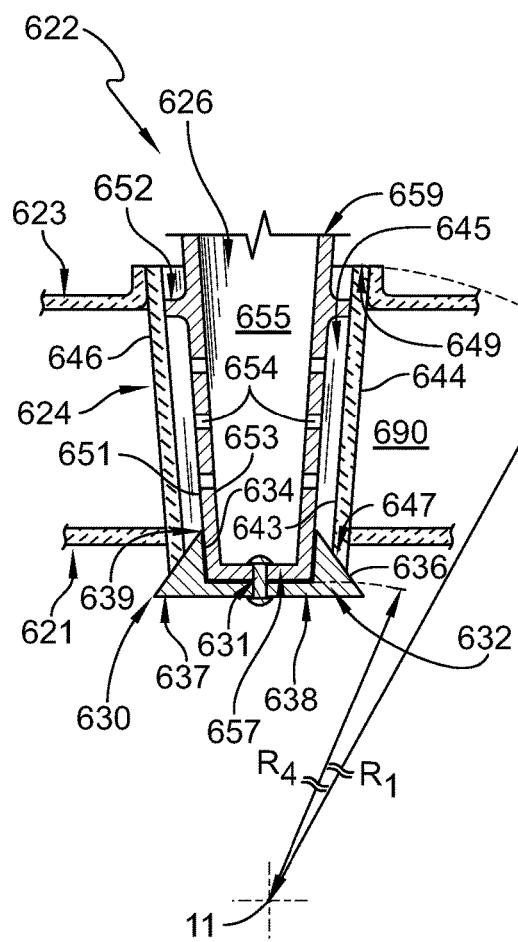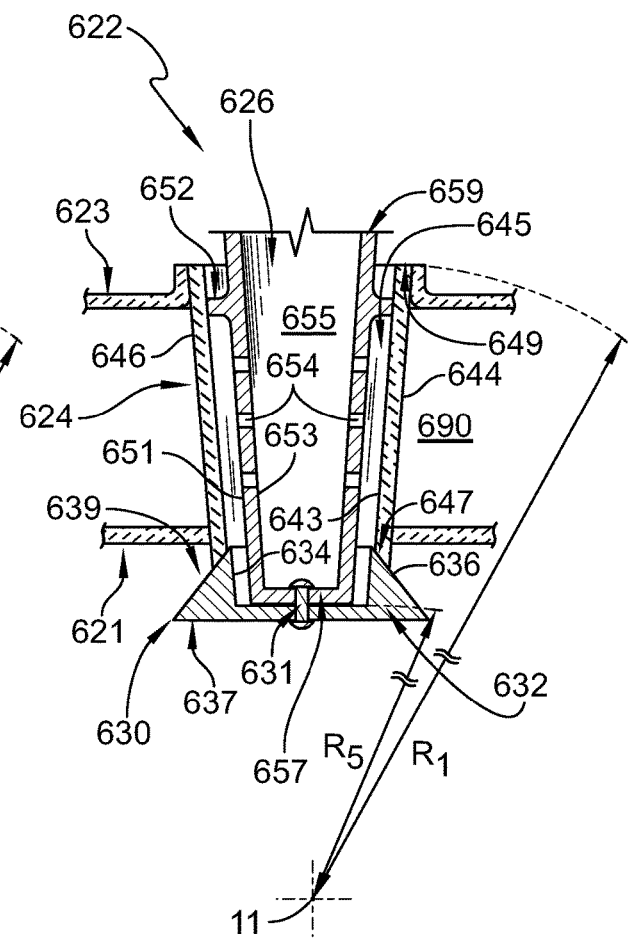
FIG. 10
FIG. 11

TURBINE VANE ASSEMBLY WITH VARIABLE POSITION SUPPORT

FIELD OF THE DISCLOSURE

The present disclosure relates generally to gas turbine engines, and more specifically to vanes used in gas turbine engines that include ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The integration of ceramic matrix composite materials into static vane assemblies is of interest because of the high-temperature capability of these materials. However, coupling ceramic matrix composite materials to other components included in gas turbine engines presents challenges based the mechanical characteristics of the various materials used (strength, coefficients of thermal expansion, etc.).

SUMMARY

The present disclosure may comprise one or more of the following features and combinations thereof.

A turbine vane assembly adapted for use in a gas turbine engine may include an airfoil, a strut, and a support member. The airfoil may be shaped to interact with hot gases moving axially along a primary gas path of the gas turbine engine relative to an axis. The airfoil may be formed to define an interior region that extends radially through the airfoil. The airfoil may comprise composite materials having a first coefficient of thermal expansion. The strut may be located in the interior region of the airfoil and arranged to carry loads applied to the airfoil by the hot gases. The strut may comprise metallic materials having a second coefficient of thermal expansion greater than the first coefficient of thermal expansion such that the strut thermally expands and contracts relative to the airfoil during use of the gas turbine engine.

The support member may be coupled to the strut for radial movement relative to the axis with thermal expansion and contraction of the strut. The support member may be configured to support the airfoil radially. The support member may comprise metallic materials having a third coefficient of thermal expansion greater than the second coefficient of thermal expansion so that radial thermal expansion and contraction of the support member relative to the strut compensates for relative radial thermal expansion and contraction between the strut and the airfoil to locate the airfoil radially relative to the axis during operation of the gas turbine engine.

In some embodiments, the turbine vane assembly further includes an inner endwall shaped to define a boundary of the primary gas path near a radial inner end of the airfoil and an outer endwall shaped to define a boundary of the primary gas path near a radial outer end of the airfoil. The first, second, and third coefficients of thermal expansion may be selected to cause the support member to maintain a radial location of the radial outer end of the airfoil relative to the outer endwall during use of the gas turbine engine.

In some embodiments, the support member may be spaced apart from the outer endwall to located the inner endwall therebetween. In some embodiments, the strut may include a radial outer end and a radial inner end spaced apart radially from the radial outer end. The support member may be coupled to the radial inner end of the strut.

In some embodiments, the support member may include a body formed to define a receiver. The radial inner end of the strut may be positioned in the receiver.

In some embodiments, the body of the support member may define a platform engaged with the airfoil. The platform may be movable relative to the radial inner end of the strut with relative expansion and contraction between the support member and the strut.

In some embodiments, the body of the support member may define an angled peripheral surface configured to move radially a radial inner end of the airfoil with relative expansion and contraction between the support member and the strut. In some embodiments, the support member may be coupled to the strut with one of a fastener and a bond layer.

In some embodiments, the turbine vane assembly further includes an inner endwall shaped to define a boundary of the primary gas path near a radial inner end of the airfoil and an outer endwall shaped to define a boundary of the primary gas path near a radial outer end of the airfoil. The airfoil, the inner endwall, and the outer endwall may be integrally formed together.

According to an aspect of the present disclosure, a turbine vane assembly adapted for use in a gas turbine engine may include an airfoil, a strut, and a support member. The airfoil may comprise materials having a first coefficient of thermal expansion and may be formed to define an interior region that extends radially through the airfoil. The strut may be located in the interior region of the airfoil and may comprise materials having a second coefficient of thermal expansion greater than the first coefficient of thermal expansion. The support member may comprise materials having a third coefficient of thermal expansion greater than the second coefficient of thermal expansion. The support member may be coupled to the strut for movement therewith and may be configured to thermally expand and contract radially relative to the strut. The support member may be configured to support the airfoil radially relative to an axis of the turbine vane assembly.

In some embodiments, the turbine vane assembly may include an inner endwall located at a radial inner end of the airfoil and an outer endwall located at a radial outer end of the airfoil. In some embodiments, the airfoil, the inner endwall, and the outer endwall may be integrally formed.

In some embodiments, the support member may be positioned radially inward of the inner endwall. In some embodiments, the strut may be formed to define an inlet port. The support member may be formed to define a conduit. The inner endwall may be formed to define an outlet port. The inlet port, the conduit, and the outlet port may be in fluid communication so that cooling fluid in an inner region of the strut is configured to flow through the strut, the support member, and the inner endwall.

In some embodiments, the strut may include a radial outer end and a radial inner end spaced apart radially from the radial outer end. The support member may be coupled to the radial inner end of the strut.

In some embodiments, the support member may include a body formed to define a receiver. The radial inner end of the strut may be positioned in the receiver.

In some embodiments, the body of the support member may have a platform that supports the airfoil. The platform may be configured to move relative to the radial inner end of the strut in response to relative expansion and contraction between the support member and the strut.

In some embodiments, the body of the support member may define an angled peripheral surface. A radial inner end of the airfoil may ride along the angled peripheral surface with relative expansion and contraction between the support member and the strut. In some embodiments, the support member may be coupled to the strut with one of a fastener and a bonding layer.

According to an aspect of the disclosure, a method may include a number of steps. The method may include providing a turbine vane assembly that includes an airfoil comprising composite materials having a first coefficient of thermal expansion and formed to define an interior region that extends radially through the airfoil, a strut comprising metallic materials having a second coefficient of thermal expansion greater than the first coefficient of thermal expansion, and a support member comprising metallic materials having a third coefficient of thermal expansion greater than the second coefficient of thermal expansion, locating the strut in the interior region of the airfoil, coupling the support member with the strut such that the airfoil is supported radially relative to an axis of the turbine vane assembly by the support member, and varying a temperature of the turbine vane assembly to cause the airfoil, the strut, and the support member to grow thermally such that radial thermal growth of the support member relative to the strut compensates for relative radial thermal growth between the strut and the airfoil.

These and other features of the present disclosure will become more apparent from the following description of the illustrative embodiments.

BRIEF DESCRIPTION OF THE DRAWINGS

FIG. 10 is a diagrammatic view of a section of another turbine vane assembly adapted for use in the gas turbine engine of FIG. 1 showing that the support member is formed to define an angled peripheral surface that engages with the airfoil to position the airfoil radially relative to the inner and outer endwalls and that the airfoil is positioned at a first radial position ($R_1$) and an inner end of the strut is positioned at a fourth radial position ($R_4$) when the gas turbine engine is operating in a first configuration; and FIG. 11 is a similar view to FIG. 10 showing that the airfoil is positioned at the first radial position ($R_1$) and the inner end of the strut is positioned at a fifth radial position ($R_5$) when the gas turbine engine is operating in a second configuration and suggesting that the support member compensates for relative expansion between the metallic strut and the ceramic airfoil.

DETAILED DESCRIPTION OF THE DRAWINGS

Figure 1:
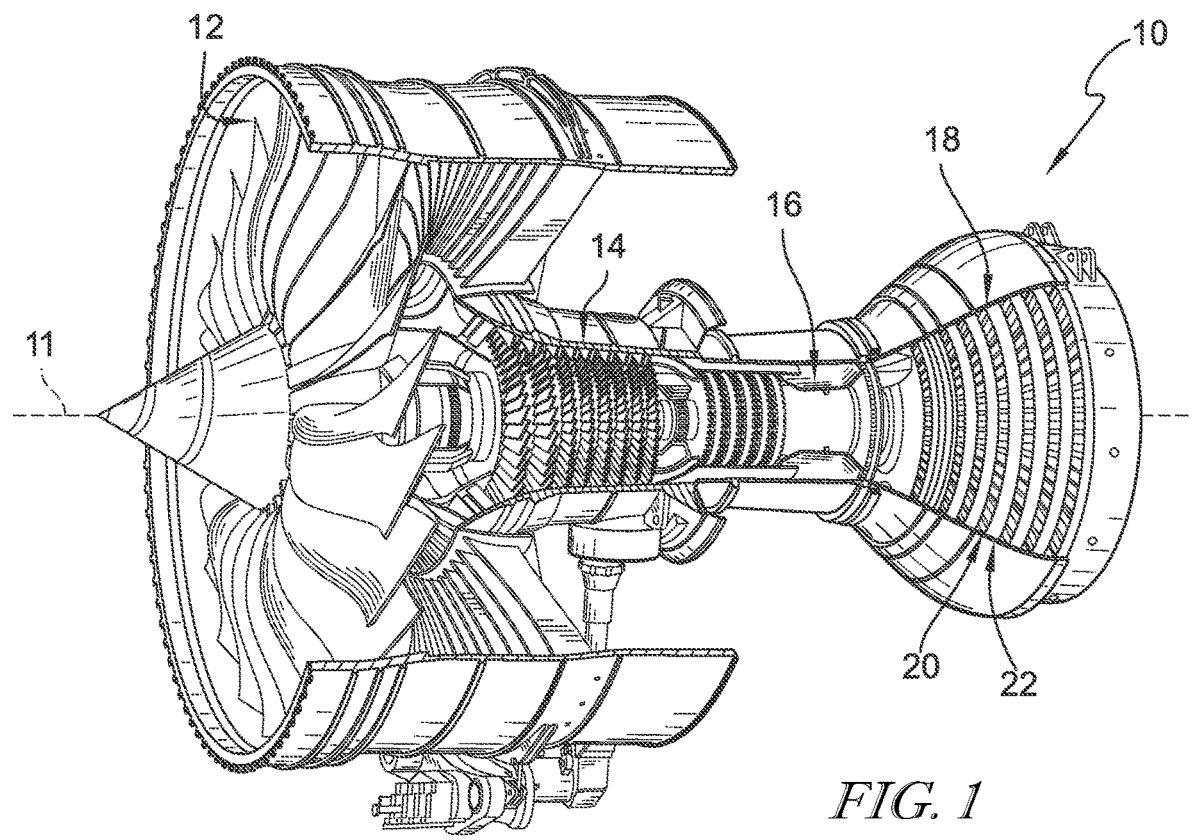
FIG. 1 is cutaway view of a gas turbine engine that includes a fan, a compressor, a combustor, and a turbine and the turbine includes a plurality of turbine vane assemblies shown with greater detail in FIGS. 2-5 and a plurality of turbine wheel assemblies.

For the purposes of promoting an understanding of the principles of the disclosure, reference will now be made to a number of illustrative embodiments illustrated in the drawings and specific language will be used to describe the same.

Figure 2:
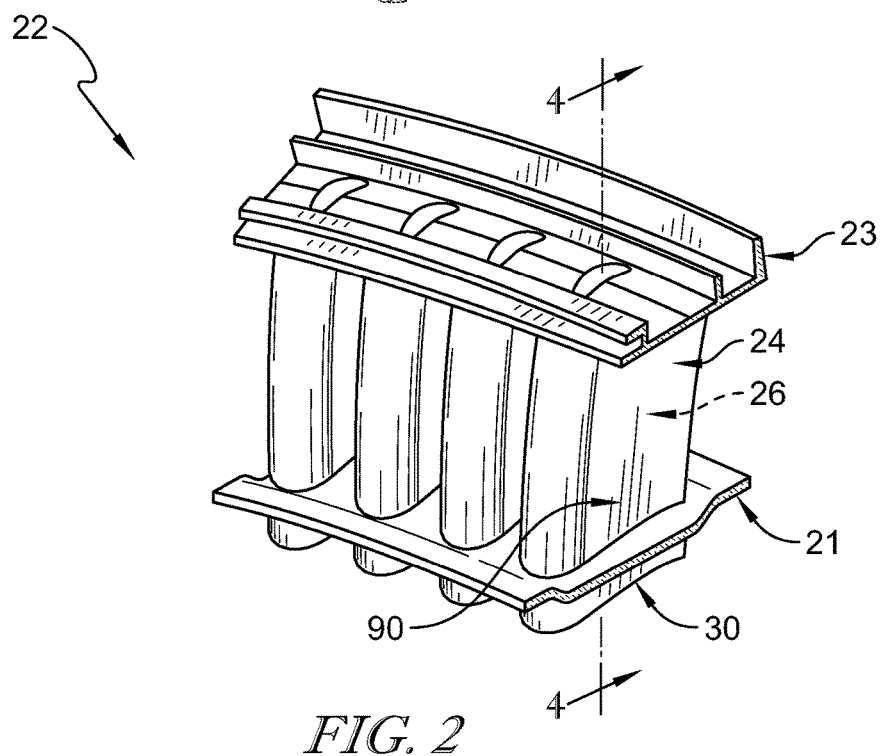
FIG. 2 is a perspective view of a portion of a turbine vane assembly included in the gas turbine engine of FIG. 1 showing that the turbine vane assembly includes an outer endwall, an inner endwall, a plurality of ceramic airfoils, and support members configured to counteract the effect of thermal growth between the components of the turbine vane assembly to maintain a location of the airfoils relative to the outer endwall during use of the engine.

A turbine vane assembly 22 according to the present disclosure is adapted for use in a gas turbine engine 10 as suggested in FIGS. 1 and 2. The gas turbine engine 10 includes a fan 12, a compressor 14, a combustor 16, and a turbine 18. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

The turbine 18 includes a plurality of turbine wheel assemblies 20 and turbine vane assemblies 22 as shown in FIG. 1. Each turbine wheel assembly 20 includes a plurality of turbine blades that interact with the hot combustion gases to rotate the turbine wheel assembly 20 about an axis 11 of the gas turbine engine 10 to generate power for driving the compressor 14 and the fan 12. The turbine vane assembly 22 is located between turbine wheel assemblies 20 to conduct gases received from an upstream turbine wheel assembly 20 toward a downstream turbine wheel assembly 20.

Figure 3:
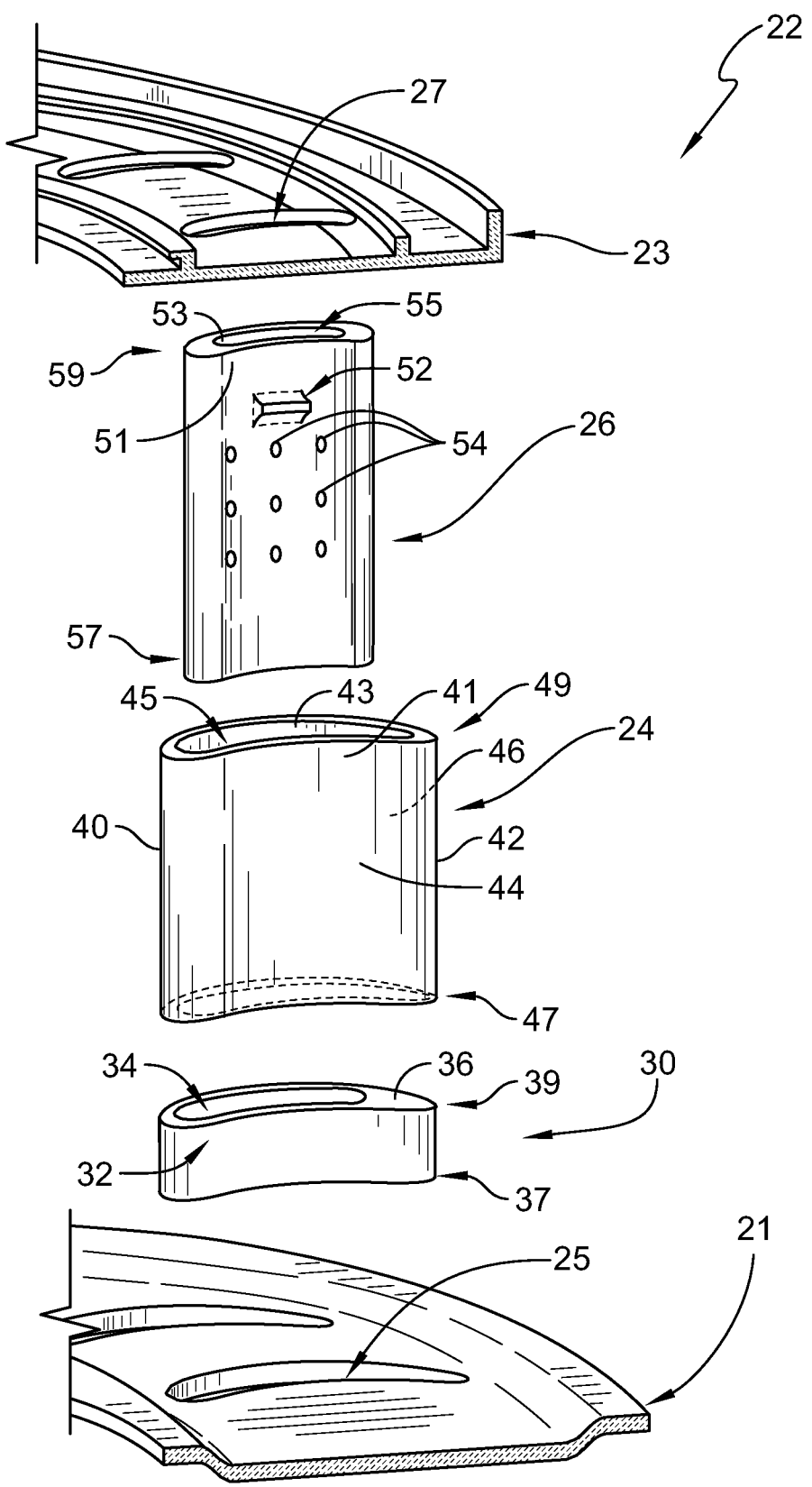
FIG. 3 is an exploded perspective assembly view of the turbine vane assembly of FIG. 2 showing that a strut is positioned to extend through the airfoil to engage with the support member and that the airfoil is positioned to rest on the support member as shown in FIGS. 4 and 5.

A section of one of the turbine vane assemblies 22 is shown in FIG. 2. The turbine vane assembly 22 includes airfoils 24, struts 26, and support members 30 as shown in FIGS. 2 and 3. In the illustrative embodiment, the turbine vane assembly 22 further includes an inner endwall 21 and an outer endwall 23 located at radial ends of the airfoils 24. The inner endwall 21 is arranged around at least a portion of the radial inner end of the airfoils 24 to define an inner boundary of the primary gas path 90. The outer endwall 23 is arranged around at least a portion of the radial outer end of the airfoils 24 to define an outer boundary of the primary gas path 90.

The airfoils 24 are shaped to interact with hot gases moving axially along a primary gas path 90 of the gas turbine engine 10 as shown in FIG. 2. The struts 26 are located in interior regions 45 of the airfoils 24 and couple with the support members 30 to carry loads that act on the airfoils 24 during operation of the gas turbine engine 10 as suggested in FIG. 4. The airfoils 24 are illustratively formed from ceramic matrix composite materials and the struts 26 are illustratively formed from metallic materials. The support members 30 are configured to compensate for relative expansion between the airfoils 24 and the struts 26 during different operational configurations of the gas turbine engine 10.

A turbine vane assembly 22 of the present disclosure may include one or more airfoils 24, one or more struts 26, and one or more support members 30. Each of the plurality of airfoils 24 are substantially to one another similar in the illustrative embodiment. Each of the plurality of struts 26 are substantially similar to one another in the illustrative embodiment. Each of the plurality of support members 30 are substantially to one another similar in the illustrative embodiment. As such, a single airfoil 24, a single strut 26, and a single support member 30 are discussed below. In some embodiments, the turbine vane assembly 22 is formed from a plurality of segments. Each segment may include one or more airfoils 24 and a corresponding number of struts 26 and support members 30. In the illustrative embodiment, the turbine vane assembly 22 is a full hoop arranged around the axis 11.

The airfoil 24 includes an outer surface 41 and an inner surface 43 as shown in FIG. 3. The outer surface 41 is airfoil shaped and defines a leading edge 40, a trailing edge 42, a pressure side 44 that extends between the leading edge 40 and the trailing edge 42, and a suction side 46 that extends between the leading edge 40 and the trailing edge 42. The inner surface 43 is spaced apart from the outer surface 41 and defines an interior region 45 of the airfoil 24. The interior region 45 extends radially through a radial inner end 47 and a radial outer end 49 of the airfoil 24.

Figure 4:
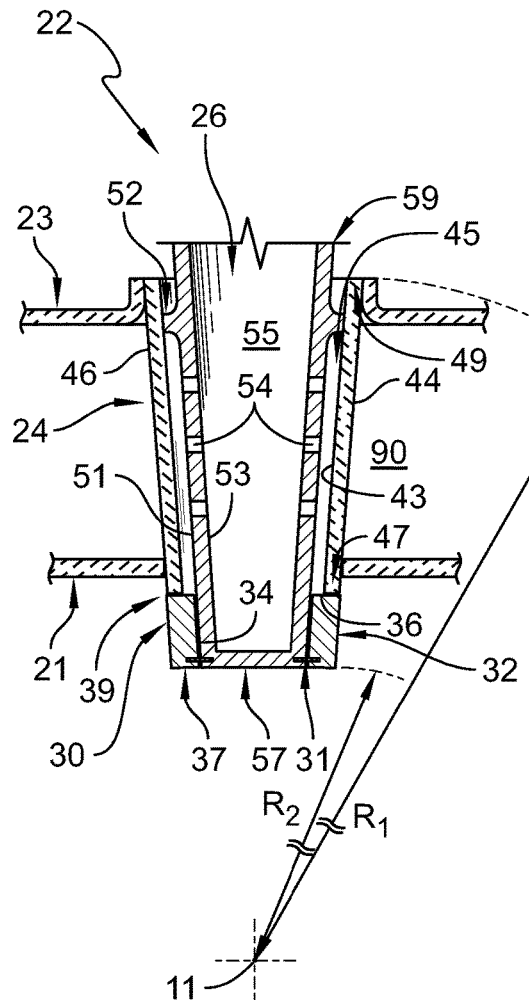
FIG. 4 is a diagrammatic view of a section of the turbine vane assembly of FIG. 2 showing that the strut is located in an interior region of the airfoil and the support member is coupled to the strut and engaged with the airfoil to position the airfoil radially relative to the inner and outer endwalls and that an outer end of the airfoil is positioned at a first radial position ($R_1$) and an inner end of the strut is positioned at a second radial position ($R_2$) when the gas turbine engine is operating in a first configuration.

The airfoil 24 is shaped to direct the hot gases moving in the primary gas path 90 toward a downstream turbine wheel assembly 20 as suggested in FIG. 4. Illustratively, the airfoil 24 is a one-piece integral component. In some embodiments, the airfoil 24 comprises only ceramic matrix composite materials. In some embodiments, the airfoil 24 comprises metallic materials.

The strut 26 includes an outer surface 51 and an inner surface 53 as shown in FIG. 3. The inner surface 53 is spaced apart from the outer surface 51 and defines an interior region 55 of the strut 26. The outer surface 51 is generally airfoil shaped. The interior region 55 extends radially into the strut from a radial outer end 59 toward a radial inner end 57 the strut 26. In the illustrative embodiment, one or more load pads 52 on the outer surface 51. The load pads 52 extend away from the outer surface 51 and engage the inner surface 43 of the airfoil 24.

In some embodiments, the load pads 52 are integrally formed with the strut 26. In some embodiments, the load pads 52 are separate from the strut 26 and are trapped between the strut 26 and the airfoil 24 when the turbine vane assembly 22 is assembled. A plurality of cooling holes 54 extend through the inner surface 53 of the strut 26 to the outer surface 51 and are configured to transmit cooling air flowing into the interior region 55 of the strut 26 toward the inner surface 43 of the airfoil 24.

The support member 30 includes a body 32 formed to define a receiver 34 as shown in FIG. 3. The body 32 defines a platform 36 for engaging with the airfoil 24. The radial inner end 57 of the strut 26 extends into the receiver 34 to couple the strut 26 with the support member 30. The body 32 extends between a radial inner end 37 and a radial outer end 39. In the illustrative embodiment, the support member 30 is formed from metallic material.

A fastener 31 engages with the strut 26 and the support member 30 to hold the support member 30 on the strut 26 as shown in FIG. 4. The fastener 31 is configured to allow the radial outer end 39 of the support member 30 to move relative to the strut 26 as the strut 26 and the support member 30 expand or contract with changes in the operational configuration of the gas turbine engine 10 as suggested in FIGS. 4 and 5. In some embodiments, the fastener 31 is a pin or clip. In some embodiments, the fastener 31 is a strip of material engaged with slots formed into the strut 26 and the support member 30.

The inner endwall 21 extends circumferentially about the axis 11 as suggested in FIGS. 3 and 4. A plurality of openings 25 are formed through the inner endwall 21 and shaped to receive one or more of the support members 30, the airfoils 24, and the struts 26. The inner endwall 21 is an annular full hoop member in the illustrative embodiment. In other embodiments, the inner endwall 21 is a segment that extends circumferentially partway about the axis and a plurality of endwall segments are arranged about the axis 11 to define the primary gas path boundary. The inner endwall 21 comprises ceramic matrix composite materials in the illustrative embodiment. In other embodiments, the inner endwall 21 comprises metallic materials. Illustratively, the inner endwall 21 and the airfoil 24 are formed as separate components.

The outer endwall 23 is arranged around the airfoil 24 at the radial outer end of the airfoil 24 as shown in FIGS. 3 and 4. A plurality of openings 27 are formed through the outer endwall 23 and shaped to receive one or more of the airfoils 24 and the struts 26. In the illustrative embodiment, the struts 26 extend radially outward from the outer endwall 23 to engage with other portions of the turbine 18 for holding the struts 26 relative to the gas turbine engine 10. The outer endwall 23 comprises ceramic matrix composite materials in the illustrative embodiment. In other embodiments, the outer endwall 23 comprises metallic materials.

The strut 26 is located in the interior region 45 of the airfoil 24 and the airfoil rests on platform 36 of support member 30 to position the airfoil 24 relative to the inner and outer endwalls 21, 23 and the primary gas path 90 as shown in FIG. 4. In the illustrative embodiment, a portion of the strut 26 extends radially outward beyond the outer endwall 23 to engage with other portions of the turbine 18 and the strut 26 is cantilevered within the turbine 18. The radial inner end 57 of the strut 26 extends radially beyond the radial inner end 47 of the airfoil 24 and through the inner endwall 21.

The support member 30 is positioned radially inside of the inner endwall 21 and positions the airfoil 24 at a first radial position $R_1$ as shown in FIG. 4. The radial inner end 57 of the strut 26 is positioned at a second radial position $R_2$ when the gas turbine engine 10 is in a first operational configuration. In some embodiments, the first operational configuration of the gas turbine engine 10 is at cold build, when the engine is off and at ambient temperature, or at idle where the components are rotating at relatively low speed and the temperature within the primary gas path 90 is relatively low.

Figure 5:
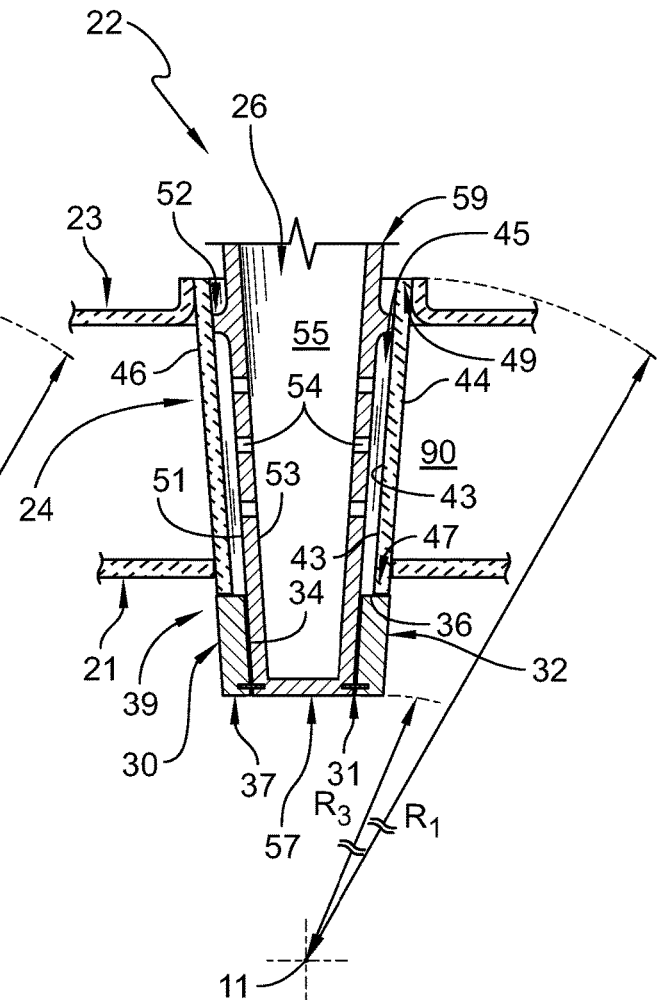
FIG. 5 is a similar view to FIG. 4 showing that the outer end of the airfoil is positioned at the first radial position ($R_1$) and the inner end of the strut is positioned at a third radial position ($R_3$) due to thermal expansion when the gas turbine engine is operating in a second configuration and suggesting that the support member compensates for differences in thermal expansion between the metallic strut and the ceramic airfoil to maintain the outer end of the airfoil at the first radial position ($R_1$)

The radial inner end 57 of the strut 26 is positioned at a third radial position $R_3$ when the gas turbine engine 10 is in a second operational configuration as shown in FIG. 5. In some embodiments, the second operational configuration of the gas turbine engine 10 is during takeoff or cruise of the aircraft where the components of gas turbine engine 10 are rotating at relatively high speed and the temperature within the primary gas path 90 is relatively high. Expansion of the strut 26 moves the radial inner end 57 inward from the second radial position $R_2$ to the third radial position $R_3$.

The support member 30 compensates for relative expansion between the airfoil 24 and the strut 26 as suggested in FIGS. 4 and 5. In the illustrative embodiment, the strut 26 has a relatively higher coefficient of thermal expansion than the airfoil 24. The support member 30 has a relatively higher coefficient of thermal expansion than the strut 26 and is configured to hold the airfoil 24 at the first radial position $R_1$ as the strut 26 expands or contracts with changes in the operational configuration of the gas turbine engine 10. The radial inner end 37 of the support member 30 moves with the radial inner end 57 of the strut 26, and the radial outer end 39 of the support member 30 is configured to move relative to the radial inner end 37 and the strut 26 with relative expansion or contraction between the strut 26 and the support member 30. In some embodiments, the size and material of support member 30 is selected to optimize a position of the airfoil 24 relative to the inner and outer endwalls 21, 23 and the primary gas path 90 for a particular operational configuration of the gas turbine engine 10, such as during cruise of the aircraft.

The load pads 52 of strut 26 engage the inner surface 43 of the airfoil 24 to locate the airfoil 24 relative to the strut 26 to provide a gap between the airfoil 24 and the outer surface 51 of the strut 26 and to transmit loads from the airfoil 24 to the strut 26 as shown in FIG. 4. In the illustrative embodiment, a first load pad 52 engages the pressure side 44 of the inner surface 43 and a second load pad 52 engages the suction side 46 of the inner surface 43. The load pads 52 are located radially toward the radial outer end 49 of the airfoil 24 and the outer boundary of the primary gas path 90 so that the metallic load pads 52 interface with the ceramic airfoil 24 toward the outer edges of the boundary of the primary gas path 90 and away from a center of the primary gas path 90 where the temperatures may be the highest. Such radial locating of the load pads 52 may reduce chemical interaction between the ceramic and metal materials. In some embodiments, one or more load pads 52 are located toward the radial inner end 47 of the airfoil 24 alternatively or in addition to the load pads 52 located toward the radial outer end 49.

Figure 6:
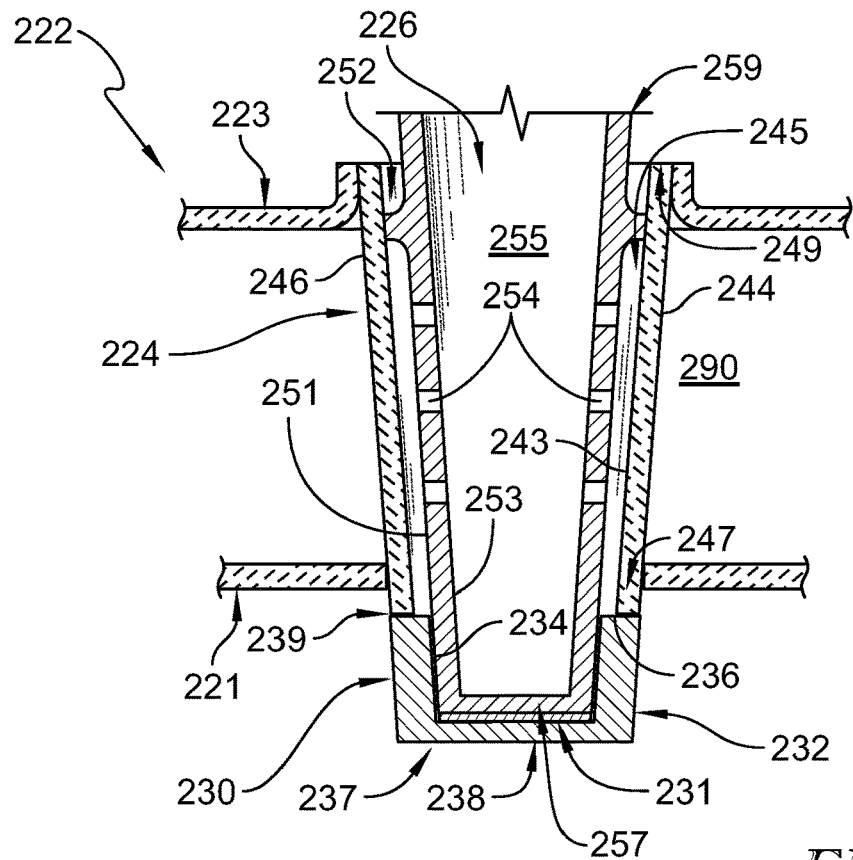
FIG. 6 is a diagrammatic view of a section of another turbine vane assembly adapted for use in the gas turbine engine of FIG. 1 showing that the support member is bonded to the inner end of the strut.

Another embodiment of a turbine vane assembly 222 in accordance with the present disclosure is shown in FIG. 6. The turbine vane assembly 222 is substantially similar to the turbine vane assembly 22 shown in FIGS. 1-5 and described herein. Accordingly, similar reference numbers in the 200 series indicate features that are common between the turbine vane assembly 22 and the turbine vane assembly 222. The description of the turbine vane assembly 22 is incorporated by reference to apply to the turbine vane assembly 222, except in instances when it conflicts with the specific description and the drawings of the turbine vane assembly 222.

The turbine vane assembly 222 includes an airfoil 224, a strut 226, and a support member 230 as shown in FIG. 6. The support member 230 includes a base wall 238 closing a radial inner end 237 of the support member 230. A bonding layer 231 couples the base wall 238 of the support member 230 with a radial inner end 257 of the strut 226. The bonding layer 231 may be formed by welding or brazing, or may include an adhesive material, for holding the support member 230 on the strut 226. A bonding layer may be used in place of fasteners or other coupling methods in other embodiments. Fasteners may be used with vane assembly 222 in other embodiments.

The radial inner end 237 of the support member 230 moves with the radial inner end 257 of the strut 226, and a radial outer end 239 of the support member 230 is configured to move relative to the radial inner end 237 and the strut 226 with relative expansion or contraction between the strut 226 and the support member 230 in accordance with the present disclosure.

Figure 7:
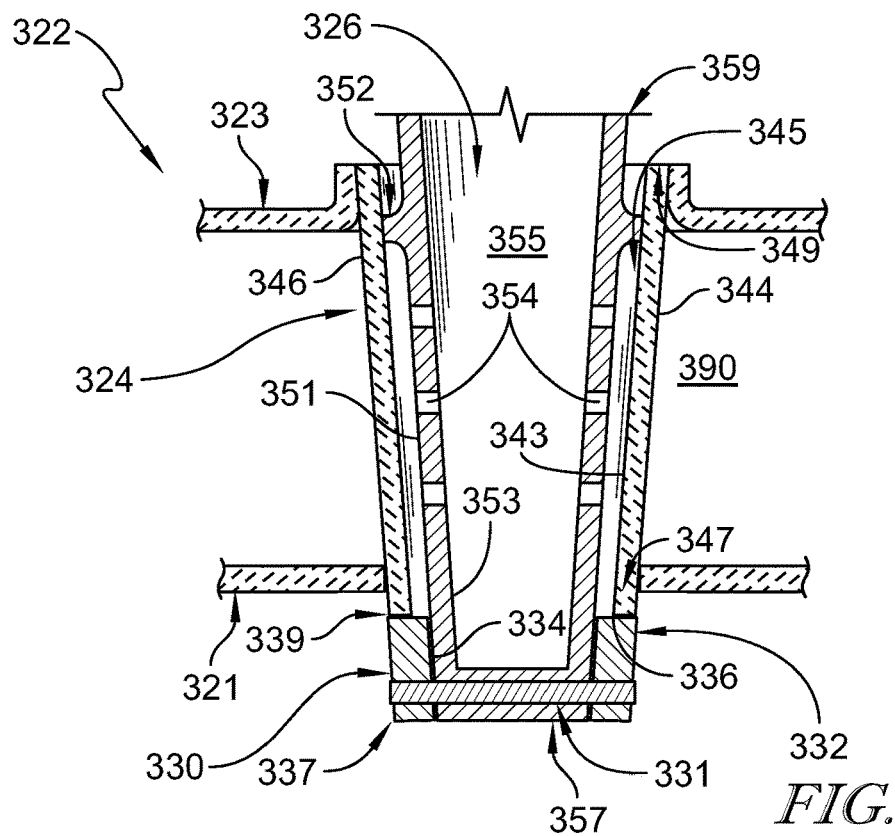
FIG. 7 is a diagrammatic view of a section of another turbine vane assembly adapted for use in the gas turbine engine of FIG. 1 showing that a pin extends through the support member and the strut to couple the support member with the strut.

Another embodiment of a turbine vane assembly 322 in accordance with the present disclosure is shown in FIG. 7. The turbine vane assembly 322 is substantially similar to the turbine vane assembly 22 shown in FIGS. 1-5 and described herein. Accordingly, similar reference numbers in the 300 series indicate features that are common between the turbine vane assembly 22 and the turbine vane assembly 322. The description of the turbine vane assembly 22 is incorporated by reference to apply to the turbine vane assembly 322, except in instances when it conflicts with the specific description and the drawings of the turbine vane assembly 322.

The turbine vane assembly 322 includes an airfoil 324, a strut 326, and a support member 330 as shown in FIG. 7. A pin 331 extends through the support member 330 and a radial inner end 357 of the strut 326 to hold the support member 330 on the strut 326. In some embodiments, a plurality of pins 331 are used. In some embodiments, slots are formed in one or both of the support member 330 and the strut 326 to allow one or more of the pins 331 to move relative to the support member 330 and/or the strut 326 during relative expansion or contraction of the support member 330 and the strut 326. A radial inner end 337 of the support member 330 moves with the radial inner end 357 of the strut 326, and a radial outer end 339 of the support member 330 is configured to move relative to the radial inner end 337 and the strut 326 with relative expansion or contraction between the strut 326 and the support member 330 in accordance with the present disclosure.

Figure 8:
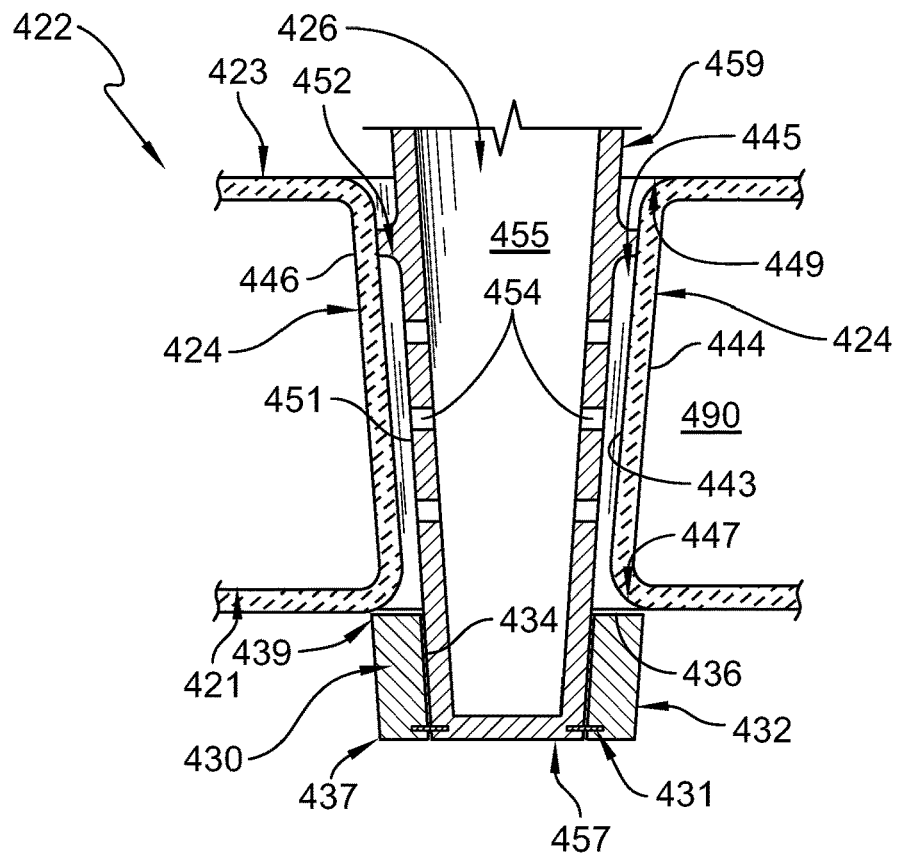
FIG. 8 is a diagrammatic view of a section of another turbine vane assembly adapted for use in the gas turbine engine of FIG. 1 showing that the inner endwall, outer endwall, and the airfoil are formed as a unitary component.

Another embodiment of a turbine vane assembly 422 in accordance with the present disclosure is shown in FIG. 8. The turbine vane assembly 422 is substantially similar to the turbine vane assembly 22 shown in FIGS. 1-5 and described herein. Accordingly, similar reference numbers in the 400 series indicate features that are common between the turbine vane assembly 22 and the turbine vane assembly 422. The description of the turbine vane assembly 22 is incorporated by reference to apply to the turbine vane assembly 422, except in instances when it conflicts with the specific description and the drawings of the turbine vane assembly 422.

The turbine vane assembly 422 includes an airfoil 424, a strut 426, and a support member 430 as shown in FIG. 8. In the illustrative embodiment, an inner endwall 421 and an outer endwall 423 are integrally formed and unitary with the airfoil 424. In some embodiments, only the outer endwall 423 or the airfoil 424 is integrally formed with the airfoil. A platform 436 of the support member 430 engages with one or more of the inner endwall 421 and the airfoil 424. A radial inner end 437 of the support member 430 moves with a radial inner end 457 of the strut 426, and a radial outer end 439 of the support member 430 is configured to move relative to the radial inner end 437 and the strut 426 with relative expansion or contraction between the strut 426 and the support member 430 in accordance with the present disclosure.

Figure 9:
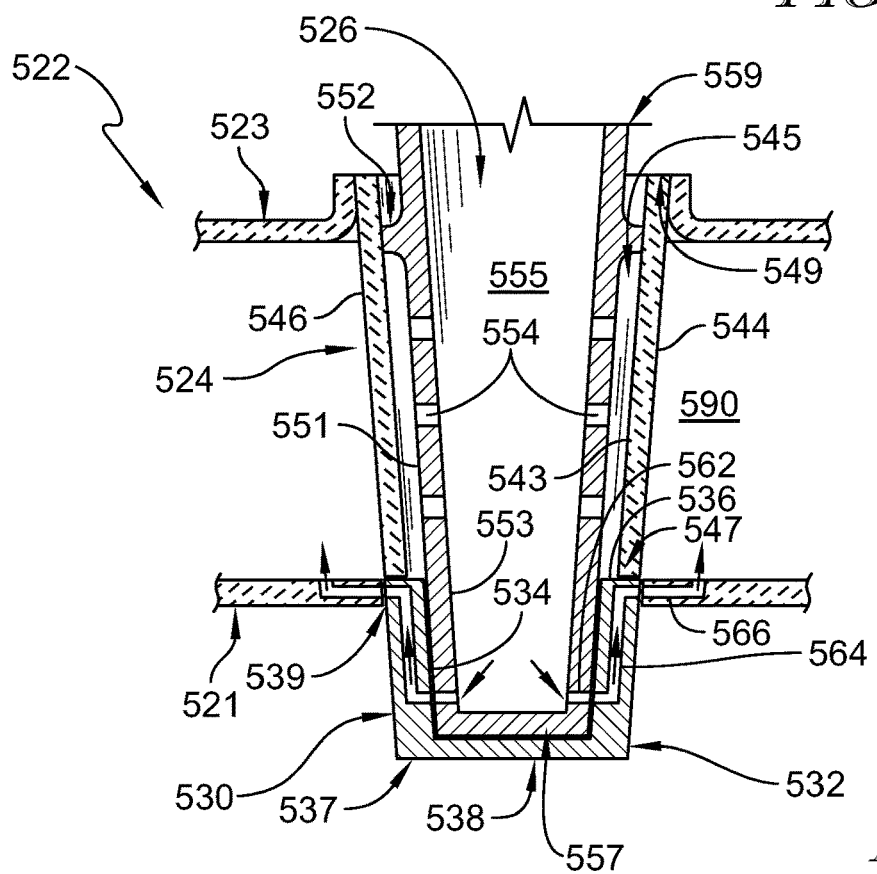
FIG. 9 is a diagrammatic view of a section of another turbine vane assembly adapted for use in the gas turbine engine of FIG. 1 showing that the support member and the strut include cooling channels to supply cooling air to the inner endwall.

Another embodiment of a turbine vane assembly 522 in accordance with the present disclosure is shown in FIG. 9. The turbine vane assembly 522 is substantially similar to the turbine vane assembly 22 shown in FIGS. 1-5 and described herein. Accordingly, similar reference numbers in the 500 series indicate features that are common between the turbine vane assembly 22 and the turbine vane assembly 522. The description of the turbine vane assembly 22 is incorporated by reference to apply to the turbine vane assembly 522, except in instances when it conflicts with the specific description and the drawings of the turbine vane assembly 522.

The turbine vane assembly 522 includes an airfoil 524, a strut 526, and a support member 530 as shown in FIG. 9. The strut 526 is formed to include one or more inlet ports 562 configured to provide cooling air through one or more conduits 564 of the support member 530 to the inner endwall 521. In the illustrative embodiment, the inner endwall 521 is formed to include one or more outlet ports 566 to allow the cooling air to pass into a primary gas path 590. In some embodiments, slots are formed in one or more of the strut 526, the support member 530, and the inner endwall 521 to allow cooling fluid such as air to flow through the inlet port 562, the conduit 564, and the outlet port 566 during relative expansion or contraction of the components.

The support member 530 is coupled to the strut 526 using one or more attachment methods as described herein. A radial inner end 537 of the support member 530 moves with a radial inner end 557 of the strut 526, and a radial outer end 539 of the support member 530 is configured to move relative to the radial inner end 537 and the strut 526 with relative expansion or contraction between the strut 526 and the support member 530 in accordance with the present disclosure.

Another embodiment of a turbine vane assembly 622 in accordance with the present disclosure is shown in FIGS. 10 and 11. The turbine vane assembly 622 is substantially similar to the turbine vane assembly 22 shown in FIGS. 1-5 and described herein. Accordingly, similar reference numbers in the 600 series indicate features that are common between the turbine vane assembly 22 and the turbine vane assembly 622. The description of the turbine vane assembly 22 is incorporated by reference to apply to the turbine vane assembly 622, except in instances when it conflicts with the specific description and the drawings of the turbine vane assembly 622.

The turbine vane assembly 622 includes an airfoil 624, a strut 626, and a support member 630 as shown in FIGS. 10 and 11. The support member 630 includes a body 632 formed to define a receiver 634 formed into the body 632. The body 632 defines an angled peripheral surface 636 (or a beveled peripheral surface) for engaging with the airfoil 624. The body 632 extends between a radial inner end 637 and a radial outer end 639. A base wall 638 closes the radial inner end 637 of the support member 630. The radial inner end 657 of the strut 626 extends into the receiver 634 and a fastener 631 engages with the strut 626 and the support member 630 to hold the support member 630 on the strut 626. In the illustrative embodiment, the fastener 631 is a rivet. In other embodiments, the fastener 631 is a screw, bolt, or other similar fastener. In the illustrative embodiment, the support member 630 is formed from metallic material.

The support member 630 is configured to expand and contract relative to the strut 626 with changes in the operational configuration of the gas turbine engine 10 as suggested in FIGS. 10 and 11. The support member 630 is positioned radially inside of the inner endwall 621 and positions the airfoil 624 at a first radial position $R_1$ as shown in FIG. 10. The radial inner end 657 of the strut 626 is positioned at a fourth radial position $R_4$ when the gas turbine engine 10 is in a first operational configuration. In some embodiments, the first operational configuration of the gas turbine engine 10 is at idle where the components are rotating at relatively low speed and the temperature within the primary gas path 690 is relatively low.

The radial inner end 657 of the strut 626 is positioned at a fifth radial position $R_5$ when the gas turbine engine 10 is in a second operational configuration as shown in FIG. 11. In some embodiments, the second operational configuration of the gas turbine engine 10 is during takeoff or cruise of the aircraft where the components of gas turbine engine 10 are rotating at relatively high speed and the temperature within the primary gas path 690 is relatively high. Expansion of the strut 626 moves the radial inner end 657 inward from the fourth radial position $R_4$ to the fifth radial position $R_5$.

The support member 630 compensates for relative expansion between the airfoil 624 and the strut 626 as suggested in FIGS. 10 and 11. In the illustrative embodiment, the strut 626 has a relatively higher coefficient of thermal expansion than the airfoil 624. The support member 630 has a relatively higher coefficient of thermal expansion than the strut 626 and is configured to hold the airfoil 624 at the first radial position $R_1$ as the strut 626 expands or contracts with changes in the operational configuration of the gas turbine engine 10. A radial inner end 647 of the airfoil 624 rides along the angled peripheral surface 636 of the support member 630 with relative expansion or contraction between the strut 626 and the support member 630. In the illustrative embodiment, the radial inner end 647 of the airfoil 624 is beveled to match a contour of the peripheral surface 636 of the support member 630 as shown in FIGS. 10 and 11. In some embodiments, the size and material of support member 630 is selected to optimize a position of the airfoil 624 relative to the inner and outer endwalls 621, 623 and a primary gas path 690 for a particular operational configuration of the gas turbine engine 10, such as during cruise of the aircraft.

The present disclosure may aid in the introduction of ceramic matrix composite materials into the turbine of gas turbine engines. Using ceramic matrix composite material may allow the reduction of cooling air usage, an increase in turbine entry temperatures, weight savings, and an overall increase in turbine efficiency.

The vane assembly 22 according to the present disclosure includes ceramic matrix composite airfoils 24, ceramic matrix composite endwalls 21, 23, a metallic support structure 26, and metallic support member 30. In one embodiment, the ceramic matrix composite components include the airfoil 24 and the endwalls 21, 23.

A mismatch in the coefficient of thermal expansion between the strut 26 and the airfoil 24 may cause the strut 26 to outgrow the airfoil 24 as the temperature increases in the turbine 18. An additional mismatch in the coefficient of thermal expansion between the strut 26 and the support member 30 allows the support member 30 to outgrow the strut 26 and the position of the airfoil 24 relative to the endwalls 21, 23.

The present disclosure provides features for introducing ceramic matrix composite materials into the turbine section of gas turbine engines. A ceramic matrix composite material may allow the reduction of cooling air usage, an increase in turbine entry temperatures, weight savings, and an overall increase in turbine efficiency. In the illustrative embodiment, a ceramic matrix composite vane includes ceramic matrix composite airfoils, ceramic matrix composite end walls, a metallic support structure, and metallic inner seal.

In illustrative embodiments, the ceramic matrix composite is assembled into the engine with a metallic spar passing through the vane core, and with a metallic retention feature positioned at the hub. The spar is positively attached to the outer turbine structure. The radial retention feature positions the hub and tip of the vane at the inner and outer flowpath locations at cold build. During thermal excursions by operating the gas turbine engine, the spar grows inward from the outer structure while the vane grows outward from the radial retention feature.

In traditional vane assemblies, due to the coefficients of thermal expansion mismatch between the metallic spar and the ceramic matrix composite vane, the spar grows inward more than the vane grows outward resulting in a misalignment of the flowpath surfaces. The present disclosure compensate for this coefficients of thermal expansion growth problem by setting up an additional coefficient of thermal expansion mis-match between the radial retainer (support member) and the spar. As the retainer out grows the spar in the outward direction, it maintains the proper positioning of the vane hub and tip.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly adapted for use in a gas turbine engine, the turbine vane assembly comprising
    an airfoil shaped to interact with hot gases moving axially along a primary gas path of the gas turbine engine relative to an axis, the airfoil formed to define an interior region that extends radially through the airfoil, and the airfoil comprising composite materials having a first coefficient of thermal expansion,
    a strut located in the interior region of the airfoil and arranged to carry loads applied to the airfoil by the hot gases, the strut comprising metallic materials having a second coefficient of thermal expansion greater than the first coefficient of thermal expansion such that the strut thermally expands and contracts relative to the airfoil during use of the gas turbine engine, and
    a support member coupled to the strut for radial movement relative to the axis with thermal expansion and contraction of the strut and configured to support the airfoil radially, the support member comprising metallic materials having a third coefficient of thermal expansion greater than the second coefficient of thermal expansion so that radial thermal expansion and contraction of the support member relative to the strut compensates for relative radial thermal expansion and contraction between the strut and the airfoil to locate the airfoil radially relative to the axis during operation of the gas turbine engine.

2. The turbine vane assembly of claim 1, further comprising an inner endwall shaped to define a boundary of the primary gas path near a radial inner end of the airfoil and an outer endwall shaped to define a boundary of the primary gas path near a radial outer end of the airfoil and the first, second, and third coefficients of thermal expansion are selected to cause the support member to maintain a radial location of the radial outer end of the airfoil relative to the outer endwall during use of the gas turbine engine.

3. The turbine vane assembly of claim 2, wherein the support member is spaced apart from the outer endwall to located the inner endwall therebetween.

4. The turbine vane assembly of claim 1, wherein the strut includes a radial outer end and a radial inner end spaced apart radially from the radial outer end and the support member is coupled to the radial inner end of the strut.

5. The turbine vane assembly of claim 4, wherein the support member includes a body formed to define a receiver and the radial inner end of the strut is positioned in the receiver.

6. The turbine vane assembly of claim 5, wherein the body of the support member defines a platform engaged with the airfoil and the platform is movable relative to the radial inner end of the strut with relative expansion and contraction between the support member and the strut.

7. The turbine vane assembly of claim 5, wherein the body of the support member defines an angled peripheral surface configured to move radially a radial inner end of the airfoil with relative expansion and contraction between the support member and the strut.

8. The turbine vane assembly of claim 1, wherein the support member is coupled to the strut with one of a fastener and a bond layer.

9. The turbine vane assembly of claim 8, further comprising an inner endwall shaped to define a boundary of the primary gas path near a radial inner end of the airfoil and an outer endwall shaped to define a boundary of the primary gas path near a radial outer end of the airfoil and the airfoil, the inner endwall, and the outer endwall are integrally formed together.

10. A turbine vane assembly adapted for use in a gas turbine engine, the turbine vane assembly comprising
    an airfoil comprising materials having a first coefficient of thermal expansion and formed to define an interior region that extends radially through the airfoil,
    a strut located in the interior region of the airfoil and comprising materials having a second coefficient of thermal expansion greater than the first coefficient of thermal expansion, and
    a support member comprising materials having a third coefficient of thermal expansion greater than the second coefficient of thermal expansion, the support member coupled to the strut for movement therewith and configured to thermally expand and contract radially relative to the strut, and the support member configured to support the airfoil radially relative to an axis of the turbine vane assembly.

11. The turbine vane assembly of claim 10, further comprising an inner endwall located at a radial inner end of the airfoil and an outer endwall located at a radial outer end of the airfoil.

12. The turbine vane assembly of claim 11, wherein the airfoil, the inner endwall, and the outer endwall are integrally formed.

13. The turbine vane assembly of claim 11, wherein the support member is positioned radially inward of the inner endwall.

14. The turbine vane assembly of claim 11, wherein the strut is formed to define an inlet port, the support member is formed to define a conduit, and the inner endwall is formed to define an outlet port and the inlet port, the conduit, and the outlet port are in fluid communication so that cooling fluid in an inner region of the strut is configured to flow through the strut, the support member, and the inner endwall.

15. The turbine vane assembly of claim 11, wherein the strut includes a radial outer end and a radial inner end spaced apart radially from the radial outer end and the support member is coupled to the radial inner end of the strut.

16. The turbine vane assembly of claim 15, wherein the support member includes a body formed to define a receiver and the radial inner end of the strut is positioned in the receiver.

17. The turbine vane assembly of claim 16, wherein the body of the support member has a platform that supports the airfoil and the platform is configured to move relative to the radial inner end of the strut in response to relative expansion and contraction between the support member and the strut.

18. The turbine vane assembly of claim 16, wherein the body of the support member defines an angled peripheral surface and a radial inner end of the airfoil rides along the angled peripheral surface with relative expansion and contraction between the support member and the strut.

19. The turbine vane assembly of claim 15, wherein the support member is coupled to the strut with one of a fastener and a bonding layer.

20. A method comprising providing a turbine vane assembly that includes an airfoil comprising composite materials having a first coefficient of thermal expansion and formed to define an interior region that extends radially through the airfoil, a strut comprising metallic materials having a second coefficient of thermal expansion greater than the first coefficient of thermal expansion, and a support member comprising metallic materials having a third coefficient of thermal expansion greater than the second coefficient of thermal expansion, locating the strut in the interior region of the airfoil, coupling the support member with the strut such that the airfoil is supported radially relative to an axis of the turbine vane assembly by the support member, and varying a temperature of the turbine vane assembly to cause the airfoil, the strut, and the support member to grow thermally such that radial thermal growth of the support member relative to the strut compensates for relative radial thermal growth between the strut and the airfoil.

* * * * *